J. H. ALFRED.
VEGETABLE SLICER.

No. 189,909. Patented April 24, 1877.

WITNESSES:
H. Rydquist
J. H. Scarborough

INVENTOR:
J. H. Alfred.
BY
ATTORNEYS.

UNITED STATES PATENT OFFICE.

JOSEPH H. ALFRED, OF ROSBACH, IOWA.

IMPROVEMENT IN VEGETABLE-SLICERS.

Specification forming part of Letters Patent No. 189,909, dated April 24, 1877; application filed February 3, 1877.

*To all whom it may concern:*

Figure 1:
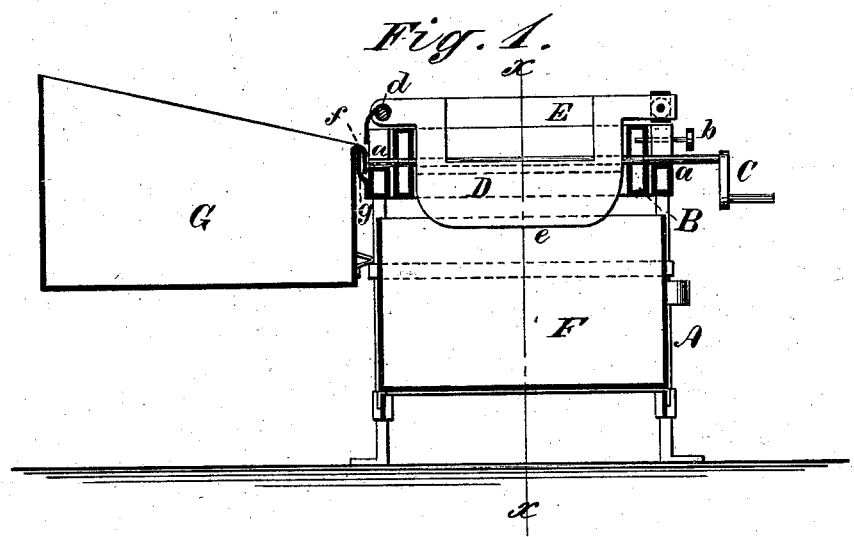
Figure 2:
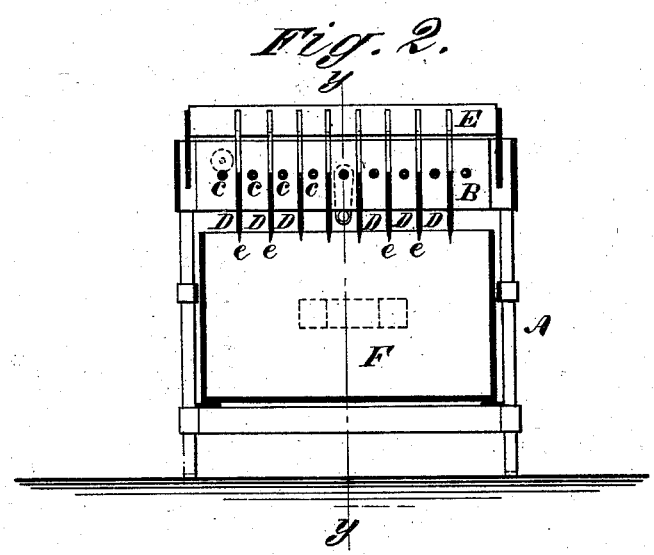

Be it known that I, JOSEPH H. ALFRED, of Rosbach, in the county of Plymouth and State of Iowa, have invented a new and Improved Bread and Vegetable Slicer, of which the following is a specification:

Figure 1 is a vertical section on line $y\,y$ in Fig. 2. Fig. 2 is a vertical section on line $x\,x$ in Fig. 1.

Similar letters of reference indicate corresponding parts.

My invention relates to apparatus for slicing bread and vegetables; and it consists of a frame containing a pivoted and grated support on which to place articles to be cut, and in a series of knives arranged tangentially to a circle described from the pivot on which they swing, and which pass between the bars of the support. The whole is supported by a frame, to which are attached receptacles for the articles to be cut, and for the slices cut by the apparatus.

In the drawing, A is a frame, in the upper portion of which a frame, B, is placed, which is pivoted in the frame A at $a\,a$, and is provided with a stop-pin, $b$, that passes through the frame A into the frame B, and holds the latter in a horizontal position.

C is a crank attached to one of the pivots of the frame B, for turning the same when required. $c\,c$, &c., are bars running across the frame B, and placed a small distance apart, for supporting the article to be sliced.

D D, &c., are knives that are secured in the frame E, which is hinged to the frame A at $d$. These knives are placed so as to pass between the bars $c\,c$ of the frame B, and their cutting-edges $e$ are arranged tangentially to a circle described from the center of the pivot or hinge upon which they turn, so that as the knives are forced downward through the article supported by the bars $c$ a drawing cut is made, which separates the article into smooth uniform slices.

G is a receptacle for articles to be cut, and also for receiving the slices from the knives. This receptacle is supported by the lip $f$, that engages the lip $g$, projecting from the frame A.

After the article is cut, the knives are thrown back, taking the slices on their backs and depositing them in the receptacle G. Should any slices or uncut pieces remain on the bars C the pin $b$ may be withdrawn and the pivoted frame B turned so as to dump the same into the box F, that is supported directly under the frame B by cross-bars in the frame A.

When the apparatus is not in use the receptacle G is placed over the frame A, forming a cover for excluding dust and dirt.

The advantages claimed for my improvement are, that a number of slices of vegetables, bread, or other articles may be cut simultaneously, effecting a great saving in time, and also that the drawing cut of the knives does the work smoothly and perfectly.

Having thus described my invention, I claim as new and desire to secure by Letters Patent—

1. A series of knives, D, supported by the frame E, the pivoted frame B, and bars $c$, and the supporting-frame A, constructed and combined substantially as herein shown and described.

2. The combination of the removable receptacle G, frame A, box F, knives D, and rods $c$, and their supporting-frame, substantially as herein shown and described.

3. The combination of the crank C, pin $b$, and pivoted frame B, substantially as herein shown and described.

JOSEPH H. ALFRED.

Witnesses:
C. J. BAUERLY,
A. S. SHEDD.